United States Patent
Chen et al.

(10) Patent No.: US 7,552,861 B2
(45) Date of Patent: Jun. 30, 2009

(54) DISPLAY SYSTEM

(75) Inventors: Ding-Guo Chen, Jhubei (TW); Ying-Chih Lee, Shengang Township (TW)

(73) Assignee: TPO Displays Corp., Chu-Nan (TW)

( * ) Notice: Subject to any disclaimer, the term of this patent is extended or adjusted under 35 U.S.C. 154(b) by 496 days.

(21) Appl. No.: 11/243,257

(22) Filed: Oct. 4, 2005

(65) Prior Publication Data
US 2007/0075977 A1    Apr. 5, 2007

(51) Int. Cl.
*G06F 17/00* (2006.01)
(52) U.S. Cl. .................. 235/375; 235/490; 345/87; 345/98
(58) Field of Classification Search .......... 235/375, 235/490; 345/183, 104, 87, 98
See application file for complete search history.

(56) References Cited

U.S. PATENT DOCUMENTS

| | | | |
|---|---|---|---|
| 5,534,892 A * | 7/1996 | Tagawa | 345/173 |
| 5,554,828 A * | 9/1996 | Primm | 178/19.06 |
| 5,684,505 A * | 11/1997 | Takita et al. | 345/104 |
| 2002/0008804 A1* | 1/2002 | Ogawa et al. | 349/58 |
| 2004/0066363 A1* | 4/2004 | Yamano et al. | 345/98 |
| 2005/0219179 A1* | 10/2005 | Kim | 345/89 |

FOREIGN PATENT DOCUMENTS

| | | |
|---|---|---|
| CN | 1423234 | 6/2003 |
| JP | 2004-055931 | 2/2004 |
| JP | 2008-006722 | 1/2008 |

* cited by examiner

*Primary Examiner*—Edwyn Labaze
(74) *Attorney, Agent, or Firm*—Liu & Liu (57) ABSTRACT

Display systems with digitizers. In a display system, an interface is coupled to a host system, and a control unit is coupled to a digitizer module, the display panel and the interface. The control unit drives the display panel to display a corresponding image and generates a scan timing signal to the digitizer module, according to an image signal from the host system via the interface. The digitizer module is coupled to the host system via the same interface and executes a scan operation to generate position data in response to the scan timing signal.

12 Claims, 8 Drawing Sheets

DISPLAY SYSTEM

BACKGROUND

The invention relates to display devices, and more particularly, to display devices with digitizers.

There are many types of touch sensitive computer input devices currently used for the purpose of digitizing touch on or in conjunction with computer displays. Such devices measure the position of a position pointer or finger touch on the sensor surface. The position is used to generate coordinates for the purpose of interacting with the computer, for example in pointing to icons on the display, picking menu items, editing computer generated images, and feedback for input of hand-drawn characters and graphics.

Such devices which sense a human touch may use any number of technologies, including capacitive sensing, resistive sensing using a conductive overlay sheet, infrared sensing, acoustic wave sensing, and piezoelectric force sensing. Digitizers which use corded hand held position pointer such as pens typically use electromagnetic sensing, electrostatic sensing, resistive sensing, or sonic pulse sensing.

Devices responsive to human touch are typically used for cursor control application, for example pointing to display icons and selection menu items. Devices responsive to position pointer (usually a corded pen) are used to create or trace drawings, blueprints, or original art. These devices are also used for character or handwriting recognition. It is therefore desirable that the sensor reproduces the trace of the position pointer by some visual means so that the user has visual feedback.

Some of these devices are responsive to both human touch and position pointer touch, thereby providing the convenience of position pointer-based input, for example when writing on the screen, as well as the ease of human touch input, which does not require the user to find the position pointer and pick it up to use it.

Figure 1:
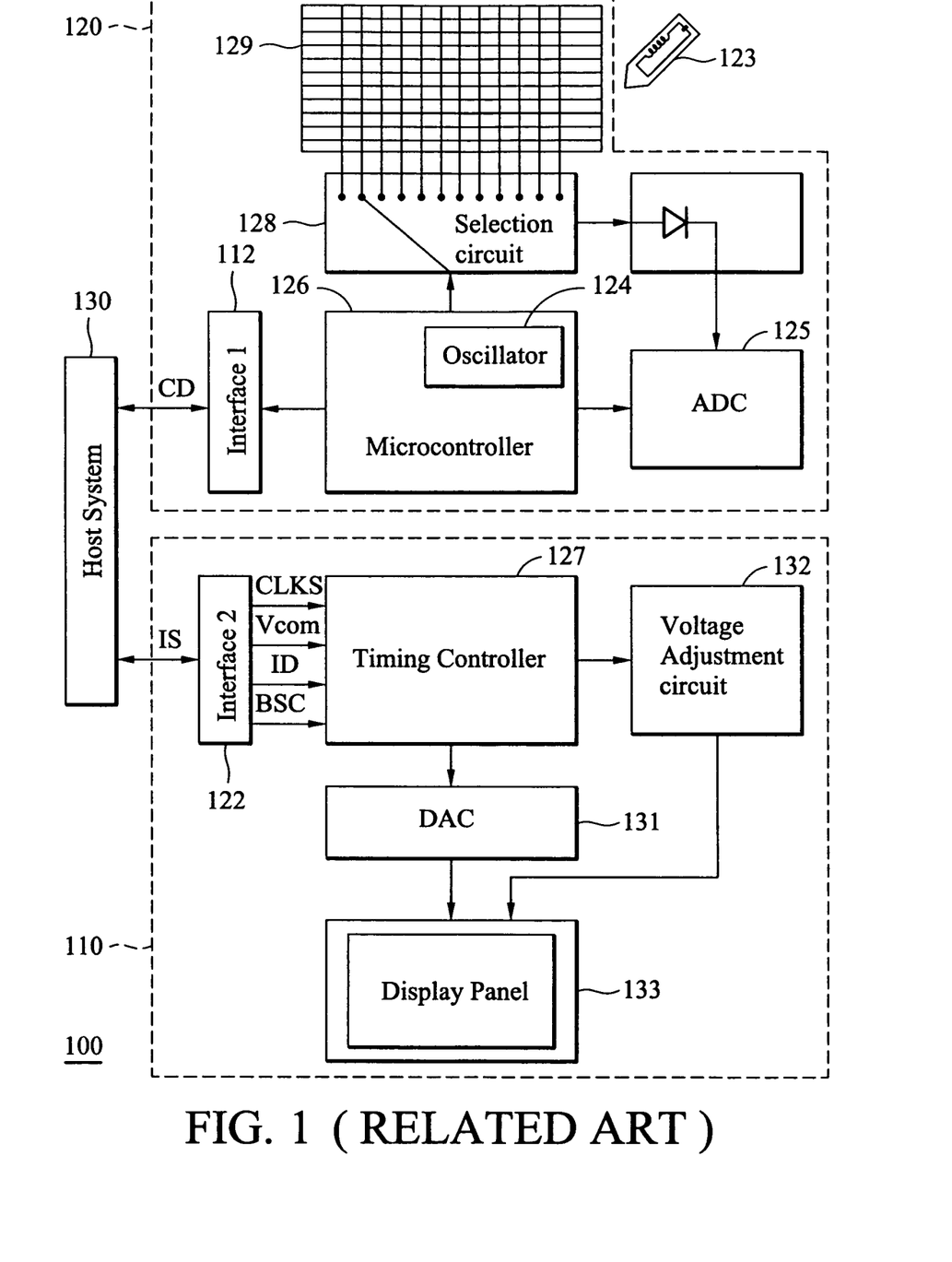
FIG. 1 is a block diagram of a conventional display system with a digitizer.
Figure 2:
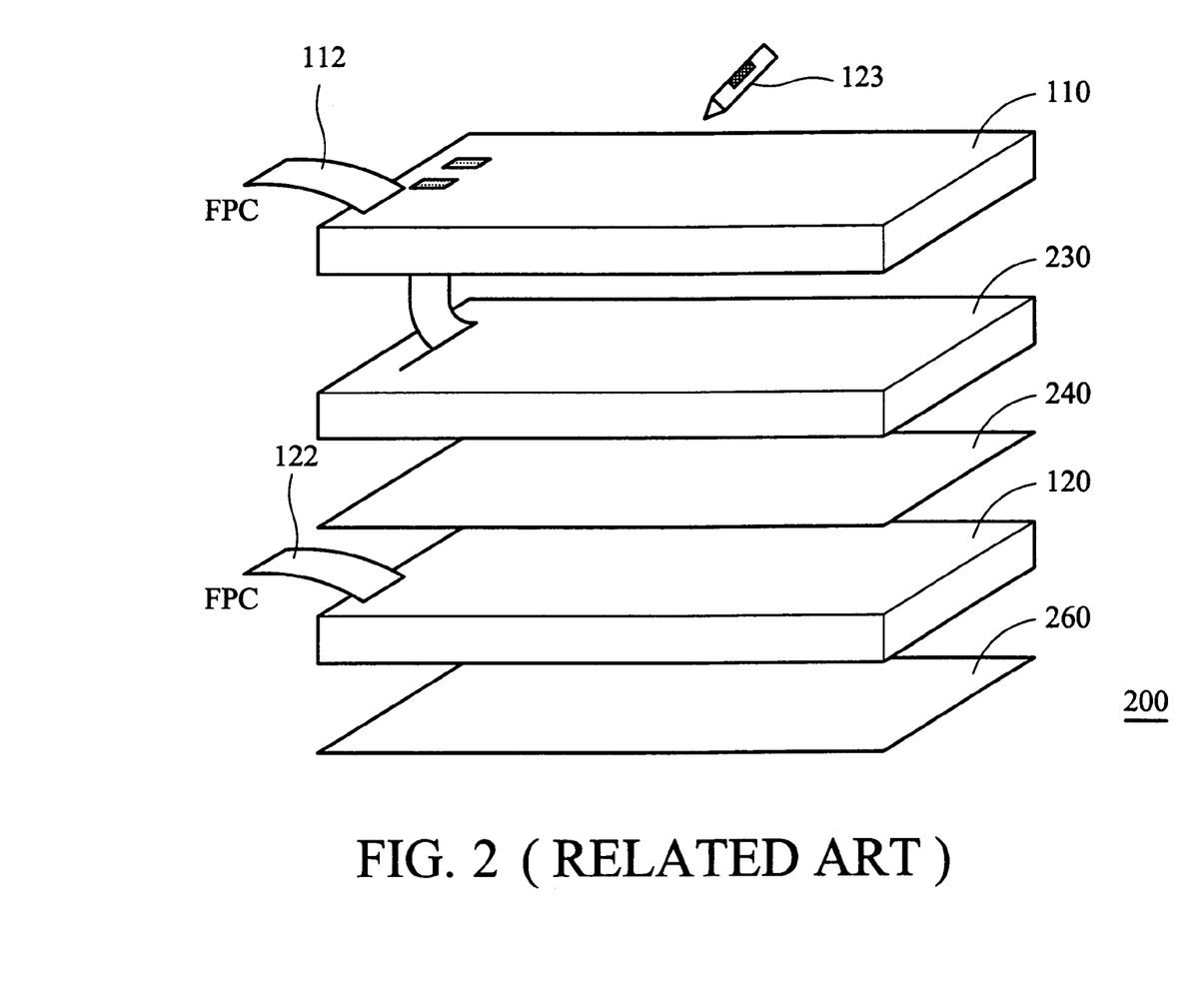
FIG. 2 is a structural diagram of a conventional display system with digitizer.

FIG. 1 is a block diagram of a conventional display system with a digitizer. As shown, display system 100 comprises LCD module 110 and digitizer module 120. The LCD module 110 and the digitizer module 120 are coupled to the host system 130 via the corresponding interfaces 112 and 122 respectively. The digitizer module 120 requires an oscillator 124 disposed in the microcontroller 126 to generate scan timing signals (not shown) for the selection circuit 128, thereby performing scan operation of sensor array 129. FIG. 2 shows a conventional display device with digitizer. As shown, the display device 200 comprises a liquid crystal display (LCD) panel 220, a back light module 230, a reflector 240, a digitizer module 120, a back frame 260 and a position pointer 123, the digitizer module 120 and the position pointer 123 constructing a digitizer. The LCD module 110 and the digitizer module 120 are coupled to an external host system 130 via different interfaces 112, 122, such as two flexible printed circuit boards (FPCs). The conventional display device, however, has disadvantages of high cost, thickness and weight.

SUMMARY

The present invention is directed to a display system comprising a display panel and a digitizer module, wherein the digitizer module is interfaced to a host system via an interface that is shared with the display panel. In accordance with one aspect of the present invention, a controller is operatively coupled to the digitizer module and the display, and is operatively coupled to the host system via an interface.

In one embodiment, the display system comprises a digitizer module, an interface coupled to a host system and a control unit coupled to the digitizer module, a display panel and the interface. The control unit drives the display panel to display a corresponding image and generates a scan timing signal to the digitizer module, according to an image signal from the host system via the interface. The digitizer module is coupled to the host system via the same interface and executes a scan operation to generate position data in response to the scan timing signal.

DESCRIPTION OF THE DRAWINGS

The invention can be more fully understood by the subsequent detailed description and examples with reference made to the accompanying drawings, wherein.

DETAILED DESCRIPTION

First Embodiment

Figure 3:
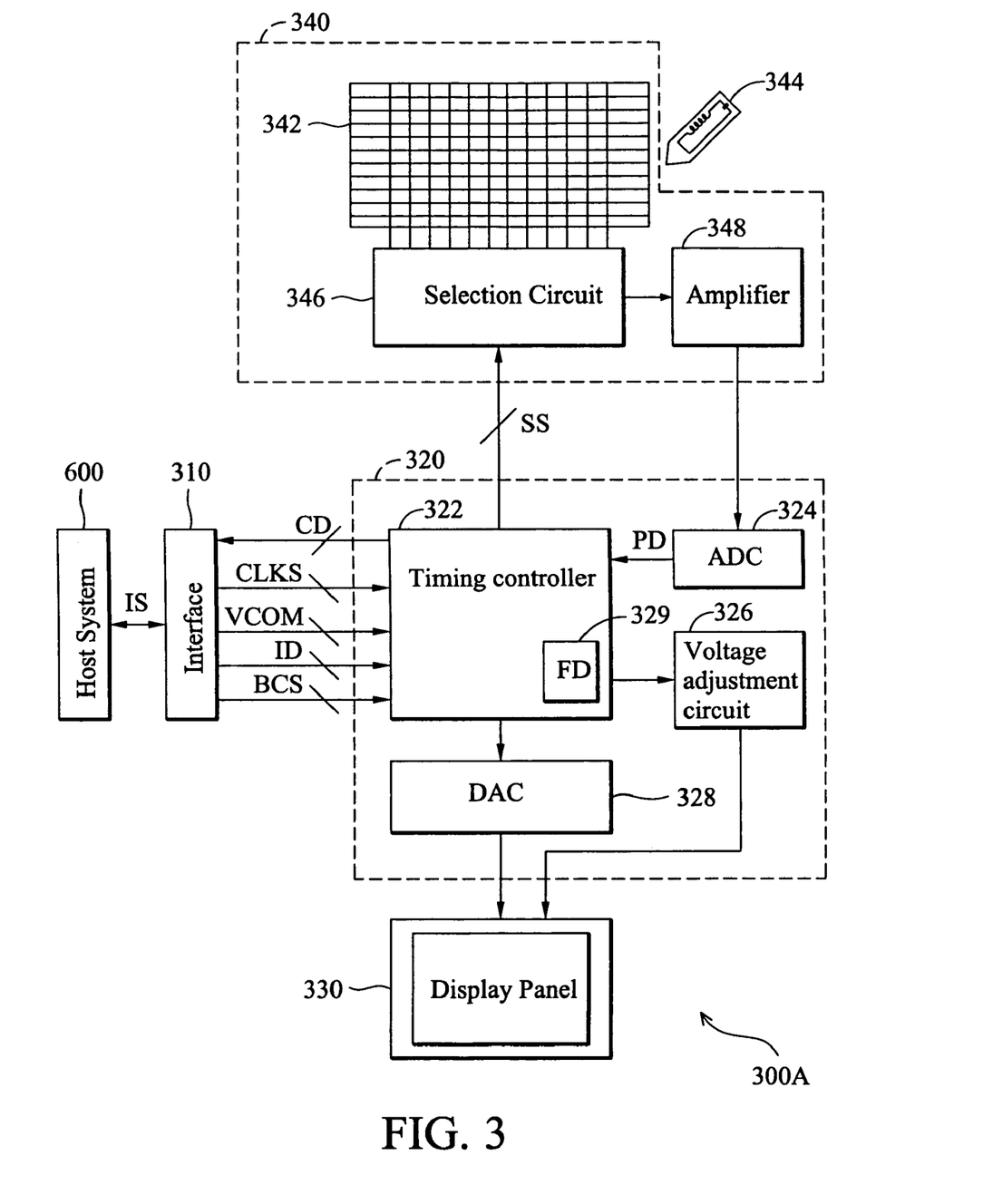
FIG. 3 is a block diagram of a first embodiment of a display system.

FIG. 3 is a block diagram of a first embodiment of a display system. The display system 300A comprises a host system 600, an interface 310, a control unit 320, a display panel 330, and a digitizer module 340.

The interface 310 is coupled between the host system and the control unit 320, to exchange data with the host system.

The control unit 320 is coupled to the interface 310, the display panel 330, and the digitizer module 340. The control unit 320 drives the display panel 330 to display a corresponding image and generates a scan timing signal (SS) to the digitizer module 340 according to an image signal (IS) from the host system 600 via the interface 310. The control unit 320 comprises a timing controller 322, an analog-to-digital converter (ADC) 324, a voltage adjustment circuit 326 and a digital-to-analog converter (DAC) 328. The control unit 320 also receives bus control signals (BCS) from the host system 600 via the interface 310, controlling the operations of the ADC 324, DAC 328 and the selection circuit 346.

The timing controller 322 is coupled to the interface 310, the display panel 330, and the digitizer module 340, generating a driving signal to drive display panel by the DAC 328 according to the image signal (IS) from the host system 600. Typically, the image signal (IS) from the host system comprises image data (ID), a clock signal (CLKS) and common voltage (Vcom), in which the signal CLKS includes a vertical scan signal (Vs), a horizontal scan signal (Hs), a data enable signal (DE), and a system clock (CLK). The timing controller 322, according to the clock signal (CLKS) of the image signal, provides reference timing signals (RTS) as show in FIG. 4A which comprises a vertical clock output (CKV), a horizontal clock output (CKH), a horizontal enable output (ENBH), a vertical enable output (ENBV), a horizontal scan direction (CSH), and a vertical scan direction (CSV) for the display panel 330. The reference timing signal (RTS) and the image data (ID) serve as the driving signal and are output to the DAC 328 to convert to analog signals driving the display panel 330 to display corresponding images. The voltage adjustment circuit 326 is coupled to the timing controller 322 and the display panel 330, adjusting the voltage level of the analog signal driving the display panel 330 according to the common voltage (Vcom).

Also, the timing controller 322 generates the scan timing signal (SS) to the digitizer module 340 according to the image signal from the host system 600. Because the frequency of scan timing signal (SS) required in digitizer module 340 is between about 100 Hz and 400 KHz and the frequency of the clock signal (CLKS) in the image signal (IS) from the host system is between 5 MHz and 6 MHz typically, the embodiment down-converts the clock signal (CLKS) in the image signal from the host system to obtain a suitable scan timing signal (SS) frequency without utilizing an oscillator as a conventional digitizer module. Thus, in this embodiment, the digitizer module 340 and the display panel 330 are coupled to the host system 600 via a single interface 310, and the timing controller of the digitizer module integrated to that of the display unit. In this embodiment, timing controller 322 comprises a frequency divider (FD) 329 to convert the clock signal (CLKS) of the image signal (IS) to the scan timing signal (SS) with a suitable frequency for the digitizer module 340.

The display panel 330 is coupled to the control unit 320 to display images according to the analog signals from the DAC 328. The display panel can be a liquid crystal display (LCD) panel, an organic light-emitting diode (OLED) display panel, or a field emission display (FED) panel.

The digitizer module 340 is typically used for cursor control application, for example pointing to display icons and picking menu items, to create or trace drawings or blueprints, and for character or handwriting recognition.

In this embodiment, the digitizer module 340 is a passive-type digitizer module coupled to the host system 600 via the interface 310, and executes a scan operation to generate position data (PD) in response to the scan timing signal (SS). The digitizer module 340 comprises a digitizer sensor array 342, a selection circuit 346, and an amplifier 348. For example, the digitizer module can be an electromagnetic sensing digitizer module, in which electromagnetic signals are transmitted from the position pointer 344 and sensed by the sensor array 342.

The digitizer sensor array 342, for example, comprises metal coil grids for both X and Y directions, sensing the position of the position pointer 344. The position pointer 344 transmits signal to the digitizer sensor array 342, and the selection circuit 346 scans the coils in the digitizer sensor array 342 according to the scan timing signal (SS) from the control unit 320, such that induced current signals in the digitizer sensor array 342 are sent to the amplifier 348, and the amplifier 348 amplifies the induced signals in the digitizer sensor array 342.

The amplified signals from the amplifier 348 are output to the ADC 324 and converted to position data (PD) and then to the timing controller 322. The timing controller 322 receives the position data (PD) relative to the position pointer 344 and determines the corresponding coordinate data (CD) of the digitizer sensor array 342 accordingly. The corresponding coordinate data (CD) of the digitizer sensor array 342 is then output to the host system 600 via the interface 310. For example, the control unit 320 can be a single chip integrated by the timing controller 322, the ADC 324, the voltage adjustment circuit 326, and the DAC 328. The control unit 320 can be mounted directly on the display panel 330 by using chip on glass (COG) process or mounted on a flexible printed circuit board (FPC) for the display panel 330.

Figure 4A:
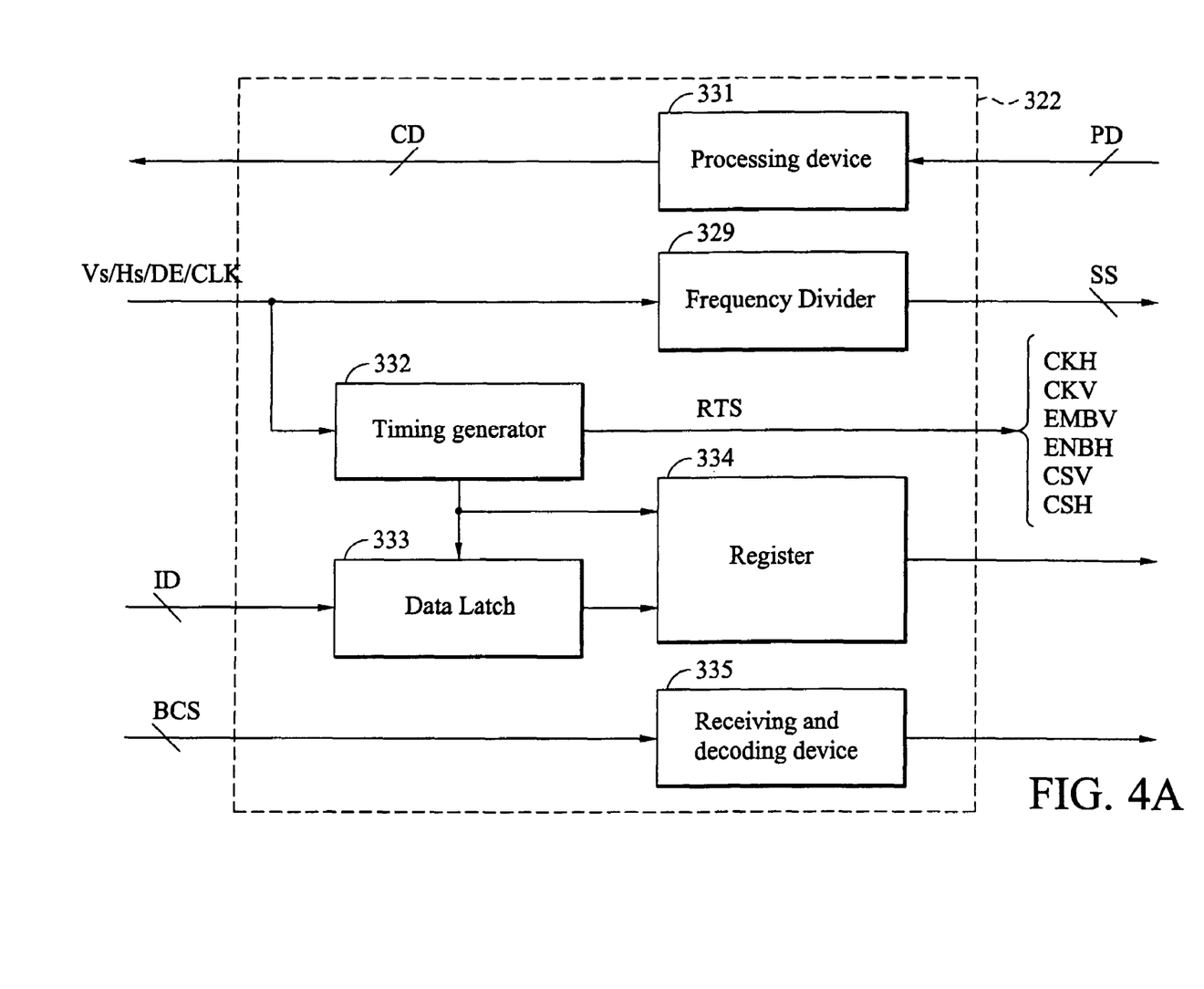
FIG. 4A shows an embodiment of a timing controller.

FIG. 4A shows an embodiment of the timing controller 322. The timing controller 322 comprises a processing device 331, a frequency divider (FD) 329, a timing generator 332, a data latch 333, a register 334, and a receiving and decoding device 335, and receives the image signal (IS) and bus control signal (BCS) from the host system 600 via the interface 310.

The processing device 331 is coupled to the ADC 324 to receive the position data (PD) and calculate the corresponding coordinate data (CD) to output to the host system 600 via the interface 310. The host system 600 receives the coordinate data CD and converts to image signals to display on the display panel. The frequency divider 329 converts the clock signal (CLKS) of the image signal to the scan timing signal (SS) with a suitable frequency, such as 100 KHz-300 KHz, for the digitizer module 340.

The timing generator 332 also receives the clock signal (CLKS) to provide reference timing signals (RTS) for the display panel 330. The image data (ID) in the image signal (IS) from the host system 600 is temporarily stored by the data latch 333 and the register 334 and output to the DAC 328 for driving the display panel 330. The receiving and decoding device 335 receives the bus control signal (BCS) from the host system 600 to generate control data controlling operations of the DAC 328, the ADC 324 and the selection circuit 346.

Thus, the invention can use single interface and integrate microcontroller 126, ADC 125 for the digitizer module 120 and timing controller 127, voltage adjustment circuit 132, DAC 131 for the LCD module 110 shown FIG. 1 into single control unit 320 that for the display system, such that cost, thickness and weight of the display device can be reduced.

Second Embodiment

Figure 4B:
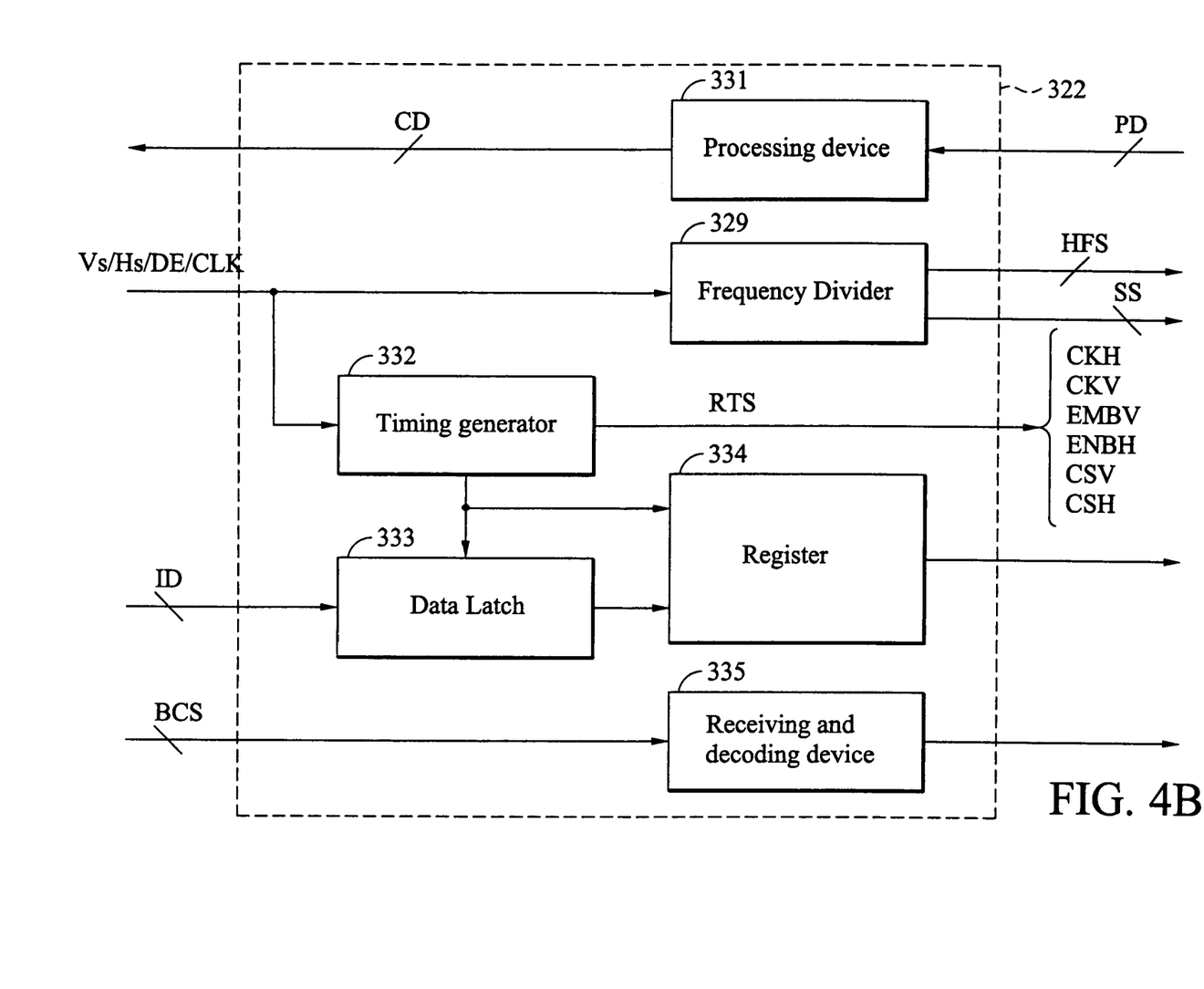
FIG. 4B shows another embodiment of a timing controller.
Figure 5:
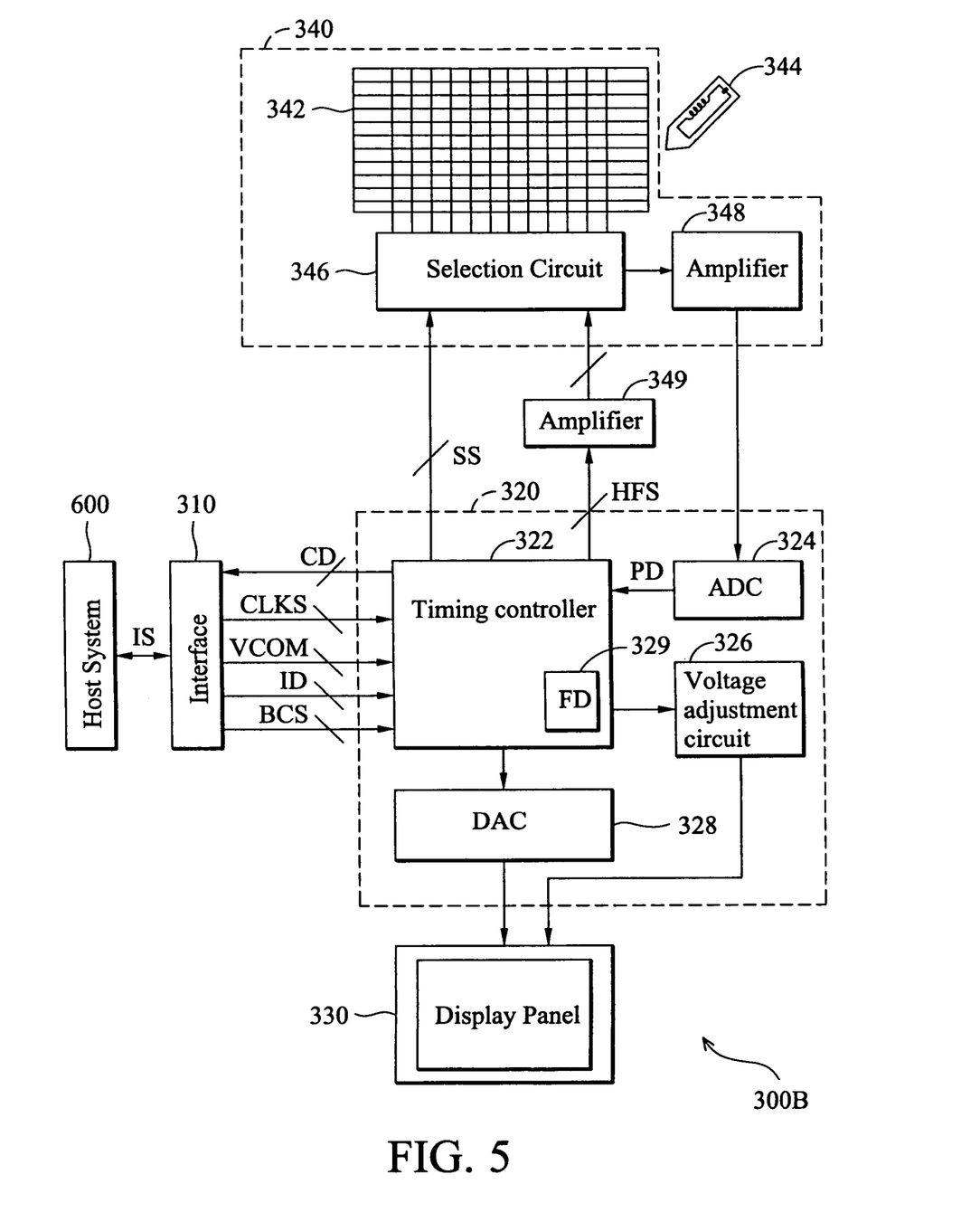
FIG. 5 is a block diagram of a second embodiment of a display system.

FIG. 4B shows another embodiment of the timing controller 322. The timing controller 322 is similar to that shown in FIG. 4A expect that the frequency divider 329 converts the clock signal (CLKS) of the image signal to the scan timing signal (SS) and a high frequency signal HFS. FIG. 5 is a block diagram of a second embodiment of a display system. The display system 300B is similar to the display system 300A shown in FIG. 3 expect that an additional amplifier 349 is coupled between the selection circuit 346 and the control unit 320.

In this embodiment, the digitizer module is an active-type digitizer module. The amplifier 349 amplifies the high frequency signal (HFS) from the frequency divider 329 for output to the selection circuit 346. The selection circuit 346 sends amplified high frequency signal HFS to each sensor coil in the digitizer sensor array 342. The digitizer sensor array 342 transmits electromagnetic signals for a predetermined time interval to the position pointer 344, and then performs a receiving mode to sensing feedback signal from the position pointer 344. For example, the electromagnetic signals from the digitizer sensor array 342 can be sensed by the position pointer 344, and the position pointer 344 transmits a corresponding signal to the sensor array 342, thereby inducing a local signal change inside the digitizer sensor array 342. The other operations and structure of the display system 300B are similar to system 300A, and thus are omitted for simplicity.

Figure 6:
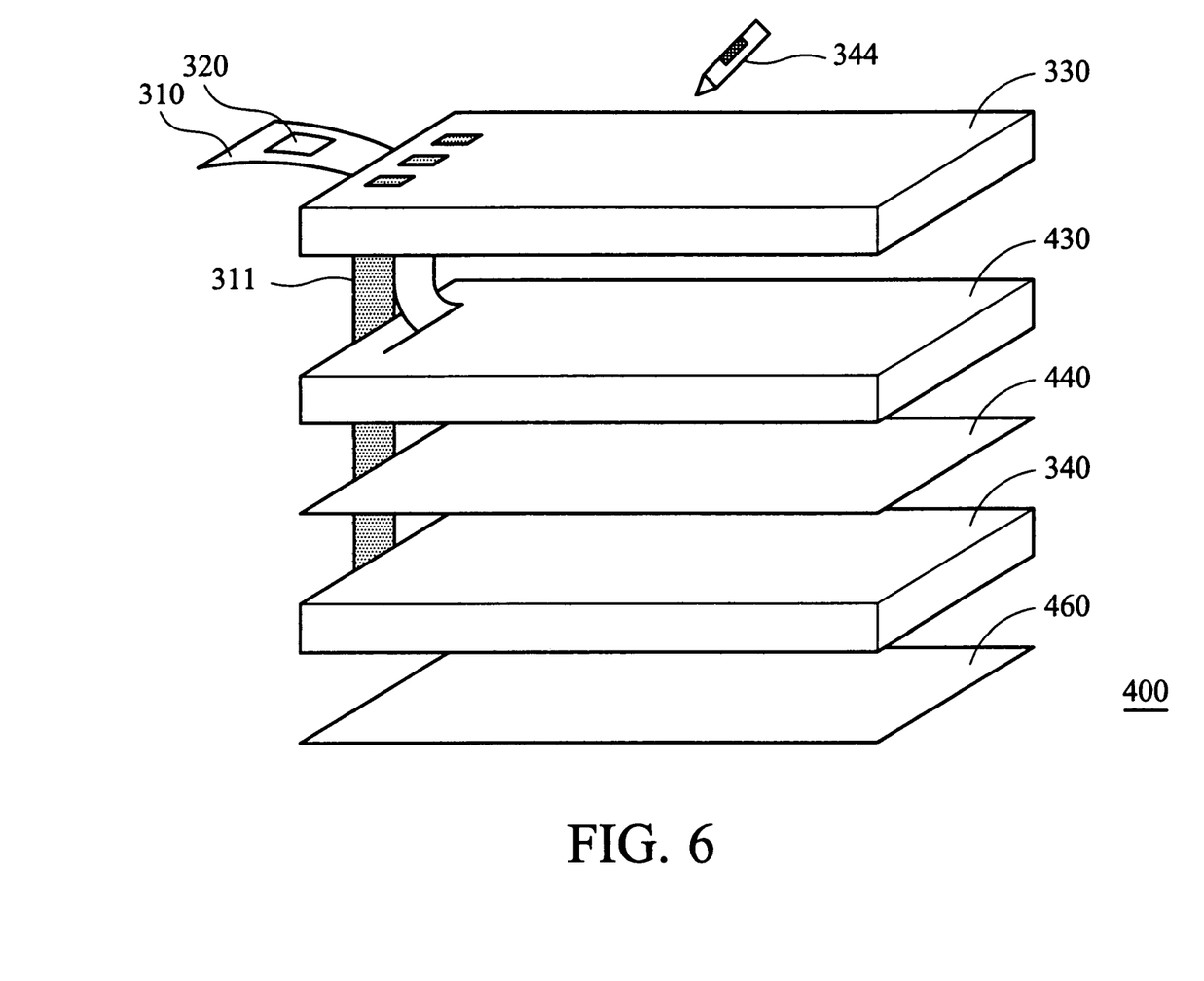
FIG. 6 show an embodiment of a LCD display system with a digitizer module.

FIG. 6 shows an embodiment of a display device 400 with a digitizer. As shown, the display device 400 comprises a display panel 330, a back lighting module 430, a reflector 440, a digitizer module 340, a back frame 460 and a position pointer 344, in which the digitizer module 340 and the position pointer 344 construct a digitizer. The display panel 330 and the digitizer module 340 are coupled to an external host system 600 via a single interface 310, such as a flexible printed circuit board (FPC). The display panel 330 and the digitizer module 340 are connected by a flexible cable 311. A control unit 320 is mounted on the flexible printed circuit board to drive the display panel to display a corresponding image and generate a scan timing signal (SS) to the digitizer module according to an image signal (IS) from the host system via the interface 310. The digitizer module executes a scan operation to generate position data (PD) in response to the scan timing signal (SS), the control unit 320 then determines the corresponding coordinate data (CD) of the position pointer 344 according to the position data and outputs to the host system. For example, the control unit 320 can also be a chip on glass structure on the display panel 330.

In this embodiment of the invention, the display panel can be a liquid crystal display (LCD) panel, an organic light-emitting diode (OLED) panel, or a field emission display (FED) panel, but it is to be understood that the invention is not limited thereto. The digitizer module can also be a capacitive sensing digitizer module, a resistive sensing digitizer module, an infrared sensing digitizer module, an acoustic wave sensing digitizer module, or a piezoelectric force sensing digitizer module, an electrostatic sensing digitizer module, or a sonic pulse sensing digitizer module.

Figure 7:
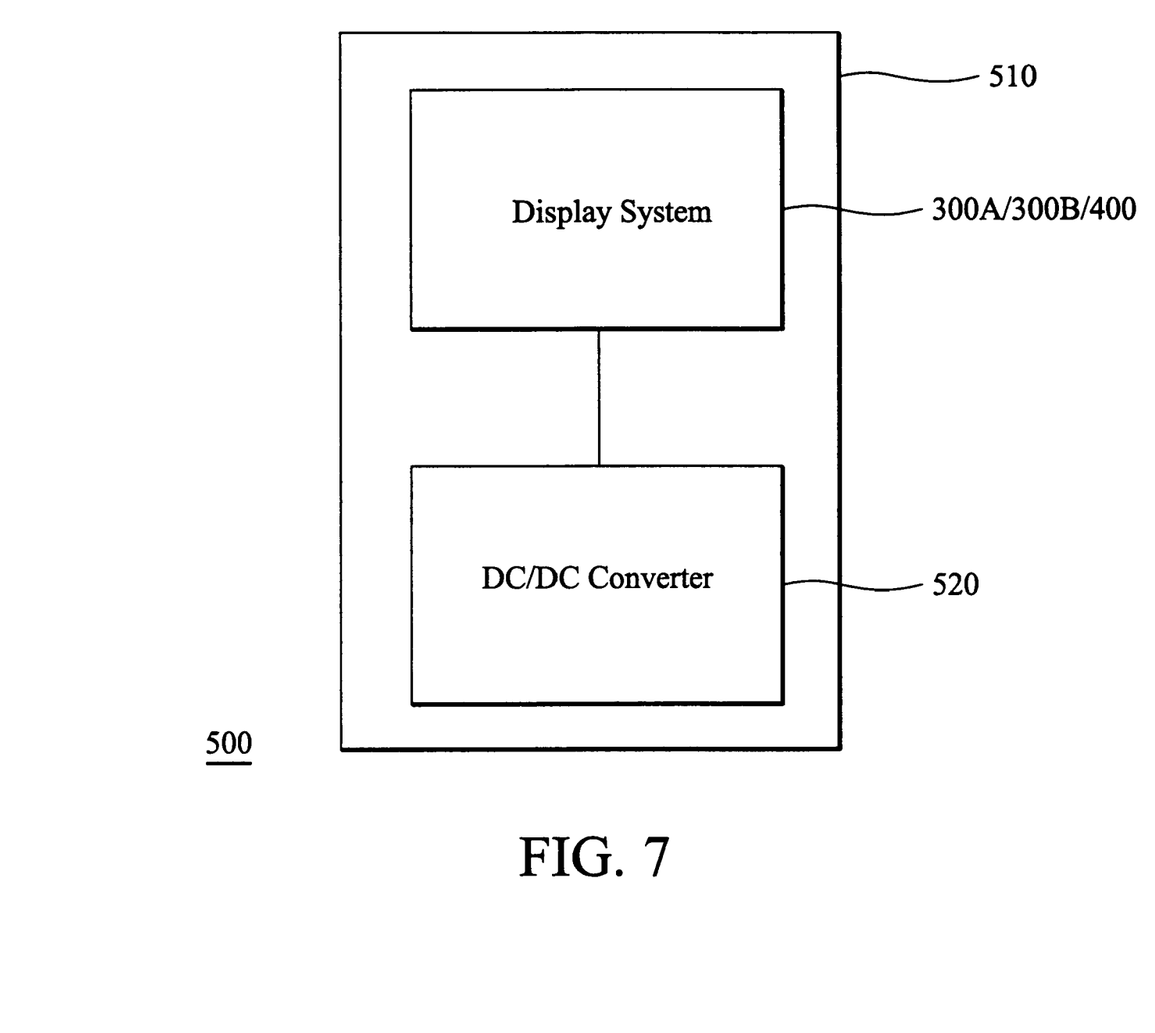
FIG. 7 schematically shows an electronic device incorporating display panel in accordance with one embodiment of the invention.

FIG. 7 schematically shows an electronic device 500 employing display system 300A, 300B or 400 described above. The display system 300A/300B can be a liquid crystal display system, an organic light-emitting diode (OLED) display system, or a field emission display (FED) system, but it is to be understood that the invention is not limited thereto. The electronic device 500 may be a portable device such as a PDA, notebook computer, tablet computer, cellular phone, or a display monitor device, etc. Generally, the electronic device 500 includes a housing 510, the display system 300A/300B/400 shown in FIGS. 3, 5 and 6, a DC/DC converter 520, etc. Further, the DC/DC converter 520 is operatively coupled to the display system 300A/300B/400 and provides an output voltage to power the display system 300A/300B/400, and the display system 300A/300B/400 is used to display image.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display system, comprising:
 an interface coupled to a host system;
 a digitizer module;
 a display panel; and
 a control unit, coupled to the digitizer module, the display panel and the interface, according to an image signal from the host system via the interface, driving the display panel to display a corresponding image and generating a scan timing signal to the digitizer module;
 wherein the digitizer module is coupled to the host system via the interface and executes a scan operation to generate position data in response to the scan timing signal,
 wherein the image signal comprises image data and a clock signal, wherein the control unit comprises a frequency divider performing frequency division to the clock signal of the image signal to generate the scan timing signal, wherein the digitizer module comprises sensor array, which is scanned in accordance with the scan timing signal to determine the position data.

2. The display system as claimed in claim 1, wherein the control unit generates coordinate data according to the position data from the digitizer module.

3. The display system as claimed in claim 1, wherein the display panel comprises at least one of a liquid crystal display (LCD) panel, an organic light-emitting diode (OLED) display panel, or a field emission display (FED) panel.

4. The display system as claimed in claim 1, wherein the control unit is a chip on glass (COG) on the display panel.

5. The display system as claimed in claim 1, wherein the control unit is mounted on a flexible printed circuit board (FPC).

6. The display system as claimed in claim 1, wherein the interface comprises a flexible cable.

7. The display system as claimed in claim 1, wherein the digitizer module comprises an active-type digitizer.

8. The display system as claimed in claim 1, wherein the digitizer module comprises a passive-type digitizer.

9. An electronics device, comprising:
 a display system as in claim 1; and
 a DC/DC converter operatively coupled to the display panel, powering the display panel to display images.

10. A display system, comprising:
 a host system;
 a display panel;
 a digitizer module that generates position data representing a user input, wherein the digitizer module and the display panel are both operatively coupled to the host system via a shared physical interface; and
 a control unit operatively coupled to the digitizer module and the display panel, and operatively coupled to the host system via the shared physical interface,
 wherein the control unit drives the display panel to display an image corresponding to an image data, and generates a scan timing signal to the digitizer module to determine the position data in a scan operation, wherein the control unit receives an image signal comprising image data and a clock signal from the host system via the shared physical interface, and performs a frequency division to the clock signal of the image signal to generate the scan timing signal, and wherein the digitizer module comprises a sensor which is in accordance with the scan timing signal to determine the position data.

11. The display system as in claim 10, wherein the shared physical interface comprises a flexible printed circuit board.

12. A method of displaying an image data in a display system, comprising:
 providing a host system;
 providing a display panel;
 providing a digitizer module that generates position data representing a user input; and
 providing a shared physical interface to operatively couple the digitizer module and the display panel to the host system via the shared physical interface; and
 providing a control unit operatively coupled to the digitizer module and the display panel, and operatively coupled to the host system via the shared physical interface,
 wherein the control unit drives the display panel to display an image corresponding to an image data, and generates a scan timing signal to the digitizer module to determine the position data in a scan operation, wherein the control unit receives an image signal comprising image data and clock signal from the host system via the shared physical interface, and performs a frequency division to the clock signal of the image signal to generate the scan timing signal, and wherein the digitizer module comprises a sensor array, which is scanned in accordance with the scan timing signal to determine the position data.

* * * * *